United States Patent [19]
Handa et al.

[11] Patent Number: 5,783,921
[45] Date of Patent: Jul. 21, 1998

[54] WELDING ROBOT WITH BASE STAND HAVING SELF CONTAINED WELDING POWER SOURCE

[75] Inventors: Hiroyuki Handa; Yukio Misumi; Shinji Okumura; Michiharu Tanaka, all of Kitakyushu, Japan

[73] Assignee: Kabushiki Kaisha Yaskawa Denki, Fukuoka, Japan

[21] Appl. No.: 722,042

[22] PCT Filed: Feb. 13, 1996

[86] PCT No.: PCT/JP96/00321

§ 371 Date: Oct. 9, 1996

§ 102(e) Date: Oct. 9, 1996

[87] PCT Pub. No.: WO96/25275

PCT Pub. Date: Aug. 22, 1996

[30] Foreign Application Priority Data

Feb. 15, 1995 [JP] Japan .................. 7-051834

[51] Int. Cl.⁶ .......................................... B25J 9/18
[52] U.S. Cl. .................. 318/568.11; 901/42; 414/731; 219/660; 219/124.1
[58] Field of Search ................ 318/560–600; 901/1, 8, 19, 50, 42; 414/744.1–744.8, 729–741; 219/602, 603, 617, 661–669, 53–54, 56, 60 R, 121.13, 124.03, 124.1

[56] References Cited

U.S. PATENT DOCUMENTS

| | | | |
|---|---|---|---|
| 4,086,522 | 4/1978 | Engelberger et al. | 318/568.13 |
| 4,538,047 | 8/1985 | Nakano et al. | 219/125.1 |
| 4,655,675 | 4/1987 | Yasuoka | 414/735 |
| 4,677,276 | 6/1987 | Nio et al. | 219/125.12 |
| 5,403,988 | 4/1995 | Kawada et al. | 219/98 |
| 5,548,096 | 8/1996 | Akasaka et al. | 219/117.1 |
| 5,658,121 | 8/1997 | Hashimoto | 414/744.1 |

FOREIGN PATENT DOCUMENTS

| | | |
|---|---|---|
| 61-199387 | 12/1986 | Japan . |
| 63-77689 | 4/1988 | Japan . |
| 2-41889 | 2/1990 | Japan . |
| 4-365581 | 12/1992 | Japan . |
| 60-158987 | 8/1996 | Japan . |

*Primary Examiner*—David S. Martin
*Attorney, Agent, or Firm*—Jordan and Hamburg

[57] ABSTRACT

A robot body has an articulated manipulator arm having a welding tool. The robot body is installed on a base stand housing electric circuits including a welding power source. The electric circuits provide for driving and controlling the welding tool. The robot thus provided minimizes the space needed for installation thereof and requires less time for installation and fewer parts, whereby it becomes possible to reduce the manufacturing cost, simplify the robot installation operation and obtain a stable welding performance.

3 Claims, 2 Drawing Sheets

WELDING ROBOT WITH BASE STAND HAVING SELF CONTAINED WELDING POWER SOURCE

BACKGROUND OF THE INVENTION

The present invention relates to a robot by which, because of an integral arc welding power source housed in a robot stand, it is possible to simplify a robot installation operation, minimize space needed for installation thereof, shorten an output cable of the welding power source and obtain a stable welding performance.

In the past, generally, a welding robot comprised three elements, i.e., a robot body (a manipulator), a robot control unit (a control panel) and a welding power source (including a wire feed mechanism), wherein the welding robot and the welding power source are installed in separate locations, and the robot and the welding power source are connected by a welding output cable. However, there is a problem in that since the installation location for the robot and the installation location for the welding power source are independent, a large installation space needs to be secured.

Instead of such a robot, there is disclosed a method for housing an arc welding power source in a robot control panel. Japanese Unexamined Patent Publication No. Hei 4-365581 is one such known method. However, since a long welding output cable connecting the robot to the welding power source is necessary, inductance of the cable is so high that detection of short-circuiting timing delays and the short-circuiting time is thus overly long, making the arc unstable. Further, the rising time of the current is extended, preventing smooth shifting to the arc, and resulting in an unstable arc.

Japanese Unexamined Patent Publication No. Sho 60-158987 is known to show an improvement in a robot as described above, and discloses a spot welding robot in which a welding power source (a transformer and a commutator) is provided at an extreme end of a robot arm. The arrangement of the welding power source at the extreme end of the arm is not preferable because a manipulator having a special construction to withstand the load thereof is necessary, and because the arm portion is excessively large.

It is therefore an object of the present invention to provide a robot which minimizes space needed for the installation thereof and requires a shorter time for installation and fewer parts, whereby it becomes possible to reduce the manufacturing cost, simplify the robot installation operation and obtain a stable welding performance.

SUMMARY OF THE INVENTION

The present invention is characterized in that a robot stand having a robot body having an articulated manipulator placed thereon is interiorly provided with electric circuits for driving and controlling operation of tools held by the robot body.

With this arrangement, it is possible to minimize the space needed for installation of an arc welding robot, simplify the installation operation and obtain a stable welding performance.

DETAILED DESCRIPTION OF THE INVENTION

Figure 1:
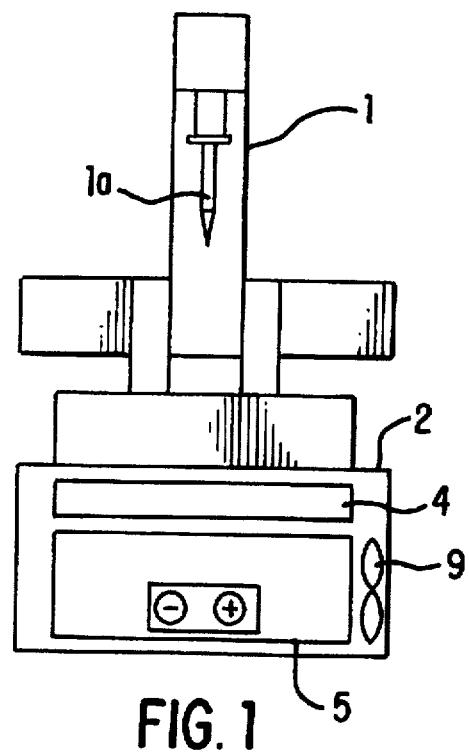
FIG. 1 a front view showing a preferred embodiment of an arc welding robot according to the present invention with a front lid removed.
Figure 2:
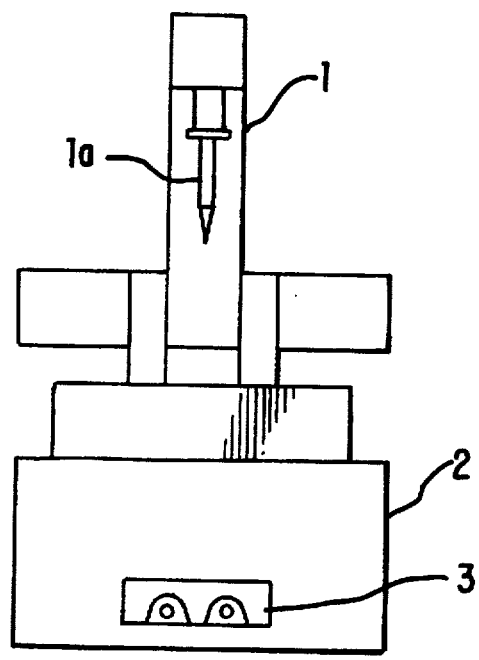
FIG. 2 is a front view showing the preferred embodiment of the arc welding robot according to the present invention with the front lid mounted.
Figure 3:
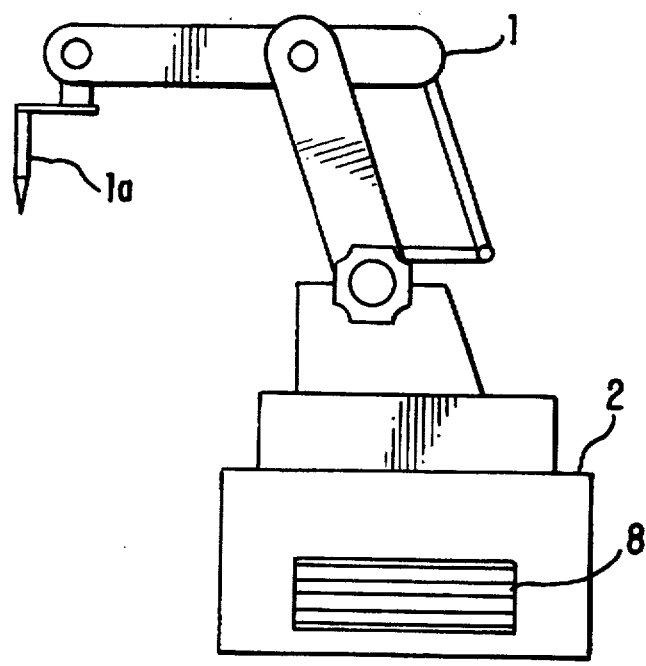
FIG. 3 is a left side view showing the preferred embodiment of the arc welding robot according to the present invention.
Figure 4:
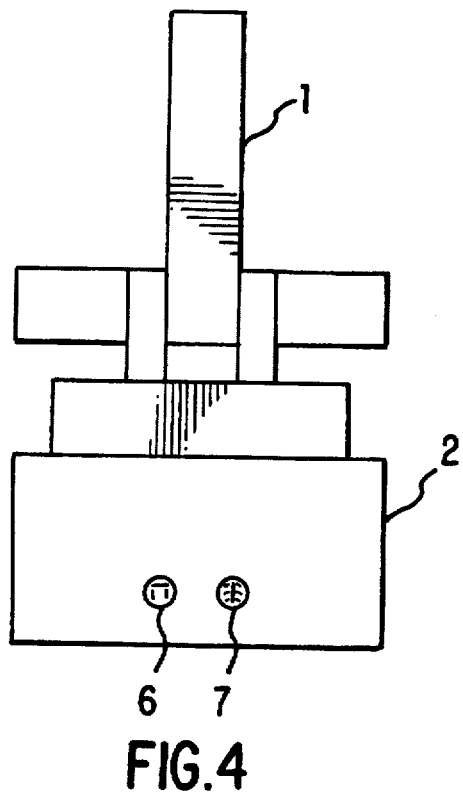
FIG. 4 is a back view showing the preferred embodiment of the arc welding robot according to the present invention.

The present invention will be described with reference to the drawings. FIG. 1 is a front view showing an arc welding robot according to the present invention with the front lid thereof removed, and FIG. 2 is a front view of the robot with the front lid mounted. FIG. 3 is a left side view of the robot, and FIG. 4 is a back view of the robot. In FIGS. 1 to 4, reference numeral 1 designates an arc welding robot; la a welding torch or welding gun; 2, an arc welding robot stand; 3, a window for an output cable of an arc welding power source; 4, a servo power unit for a motor of the robot; 5, an arc welding power source; 6, a power source plug for supplying power to the servo power unit and the arc welding power source; 7, a plug receptor for an interface; 8, a ventilator; and 9, a blower. In this embodiment, the servo-power unit 4 for the robot motor is also housed in the stand along with the arc welding power source 5 which is an electric circuit for driving and controlling the operation of tools held by the robot body.

As shown, the stand 2 for the arc welding robot 1 houses therein servo-power unit 4 for driving the motor of arc welding robot 1 and arc welding power source 5, air cooling ventilator 8 and blower 9 are provided on the side of stand 2, output cable window 3 is provided on the front surface of stand 2, and power source plug 6 for supplying power to servo-power unit 4 and welding power source 5 and plug receptor 7 for the interface cable connected to a robot controller are provided on the back of stand 2. The stand 2 also serves as an electromagnetic shield for the power source While in this embodiment, the arc welding robot is shown, the invention is not limited thereto but can be applied to all robots.

The invention provides a great advantage particularly in situations which require a relatively large electric circuit for driving and controlling tools held by the robot.

Further, in the case where the electric circuit for driving and controlling the robot body (manipulator) is housed in the stand as in the above-described embodiment, the circuit which is located within the robot control panel in the past can be transferred to the stand. This produces the additional effect that the robot control panel can be miniaturized.

There is a further effect in that if the air cooling means is strengthened, heat generated on the robot body side can also be expelled through the stand.

As described above, the robot according to the present invention is suited for use in arc welding or the like, among other uses.

We claim:

1. An arc welding robot comprising:

a robot base stand having a robot body supported thereon;

said robot body including an articulated manipulator arm;

said articulated manipulator arm having one of a welding torch and a welding gun mounted thereon;

said robot base stand having electric circuits provided interiorly for driving and controlling operation of said one of said welding torch and said welding gun;

said electric circuits including a power source for said one of said welding torch and said welding gun; and said robot base stand serving to effect an electromagnetic shield about said electric circuits.

2. The arc welding robot according to claim 1 wherein said robot base stand includes a blower provided interiorly for air cooling said electric circuits, and a ventilator.

3. The arc welding robot according to claims 1 or 2, wherein said articulated manipulator arm includes an electric motor for moving said articulated manipulator arm and said robot base stand includes a servo-circuit provided interiorly for driving said electric motor to move said articulated manipulator arm.

* * * * *